US012609552B1

(12) United States Patent
Shaffer et al.

(10) Patent No.: US 12,609,552 B1
(45) Date of Patent: Apr. 21, 2026

(54) BATTERY CHARGER AND METHOD OF CONTROL WITH FAST CHARGE MODE

(71) Applicant: Brunswick Corporation, Mettawa, IL (US)

(72) Inventors: Benjamin C. Shaffer, Bedford, NH (US); Gerald J. Demirjian, Auburn, NH (US); Ximing He, Auburn, NH (US)

(73) Assignee: Brunswick Corporation, Mettawa, IL (US)

( * ) Notice: Subject to any disclaimer, the term of this patent is extended or adjusted under 35 U.S.C. 154(b) by 1139 days.

(21) Appl. No.: 17/523,690

(22) Filed: Nov. 10, 2021

(51) Int. Cl.
| | |
|---|---|
| *H02J 7/00* | (2026.01) |
| *H01M 10/44* | (2006.01) |
| *H01M 10/48* | (2006.01) |
| *H01M 10/613* | (2014.01) |
| *H02H 7/18* | (2006.01) |
| *H02J 7/65* | (2026.01) |
| *H02J 7/90* | (2026.01) |

(52) U.S. Cl.
CPC ........... *H02J 7/977* (2026.01); *H01M 10/443* (2013.01); *H01M 10/486* (2013.01); *H01M 10/613* (2015.04); *H02H 7/18* (2013.01); *H02J 7/65* (2026.01)

(58) Field of Classification Search
CPC ................................................. H02J 7/007194
USPC ......................................................... 320/150
See application file for complete search history.

(56) References Cited

U.S. PATENT DOCUMENTS

| | | | |
|---|---|---|---|
| 5,204,611 A | | 4/1993 | Nor et al. |
| 6,204,639 B1 * | | 3/2001 | Takano ............... H02J 7/00047 |
| | | | 320/150 |
| 6,949,914 B2 | | 9/2005 | Aradachi et al. |
| 7,170,260 B2 | | 1/2007 | Thrap |
| 8,054,039 B2 | | 11/2011 | Bauerle et al. |
| 8,183,819 B2 | | 5/2012 | Sugano |
| 8,350,526 B2 | | 1/2013 | Dyer et al. |
| 8,803,477 B2 | | 8/2014 | Kittell |
| 9,608,461 B2 | | 3/2017 | Chen et al. |
| 10,431,992 B2 | | 10/2019 | Kawamura et al. |
| 2005/0017691 A1 * | | 1/2005 | Aradachi .......... H02J 7/007194 |
| | | | 320/150 |
| 2006/0172188 A1 * | | 8/2006 | Okuda ................ H01M 10/625 |
| | | | 429/62 |
| 2016/0020618 A1 | | 1/2016 | Yang et al. |
| 2016/0099581 A1 * | | 4/2016 | Kawamura ........... H02J 7/0048 |
| | | | 320/107 |

* cited by examiner

*Primary Examiner* — Yalkew Fantu
(74) *Attorney, Agent, or Firm* — Andrus Intellectual Property Law, LLP

(57) ABSTRACT

A method of controlling a battery charger to charge a battery includes setting a fan speed threshold for a fan within a battery charger, wherein the fan speed threshold is less than a maximum fan speed of the fan. The operating speed of the fan in the battery charger is controlled so as not to exceed the fan speed threshold and the battery charger is controlled to deliver a first charge current such that a temperature of the battery charger does not exceed a first temperature threshold while the operating speed of the fan remains at or below the fan speed threshold. A user input is received to engage a fast charge mode and, in response thereto, the operating speed of the fan is increased above the fan speed threshold so as not to exceed the maximum fan speed.

22 Claims, 5 Drawing Sheets

BATTERY CHARGER AND METHOD OF CONTROL WITH FAST CHARGE MODE

FIELD

The present disclosure generally relates to battery chargers, such as marine battery chargers configured to be installed on a vessel to charge a marine battery.

BACKGROUND

Battery charger systems are configured to distribute power received at a power outlet, or connection point to a power source, which in various embodiments may be an alternating current (AC) or a direct current (DC) source. For example, the power outlet may be an AC power outlet that connects to electricity supplied by a power grid. Various power socket arrangements are available for connection to power, such as AC outlets, with corresponding plug standards configured to mate with those sockets to receive power that conforms to a corresponding standard. Various standards are established for mains electricity, or utility power, including a nominal voltage and a frequency. In much of the world, electric power supplied by mains electricity, or utility power, is at a voltage (nominally) of 230 volts and at a frequency of 50 hertz. In North America, AC electric power is typically provided at a frequency of 60 hertz and either 120 volts (most common) or 230 volts. Non-interchangeable plugs and sockets are established for different power supply standards, which provide some protection from accidental use of appliances with incompatible voltage and/or frequency requirements.

Typically, battery chargers are configured to receive AC power by connection to an AC power outlet and to deliver DC power to charge a battery. Many battery charger systems, such as marine battery charger systems, include an internal controller that controls the internal power supply circuit to operate in different power delivery modes. Battery chargers are typically configured to operate in a plurality of modes based on the voltage or state of charge of the battery being charged. This plurality of modes typically includes at least a bulk mode where bulk charge is delivered to the battery, and a float mode where the battery is fully charged, and the charger is operating to only deliver power as needed to maintain the battery in the fully charged state. The plurality of modes may further include an absorption mode, or conditioning mode, where the battery is taken from a nearly charged state or voltage level to fully charged. These battery charger operation modes and functions, as well as others, are well known in the relevant art.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling a battery charger to charge a battery includes setting a fan speed threshold for a fan within a battery charger, wherein the fan speed threshold is less than a maximum fan speed of the fan. The operating speed of the fan in the battery charger is controlled so as not to exceed the fan speed threshold and the battery charger is controlled to deliver a first charge current such that a temperature of the battery charger does not exceed a first temperature threshold while the operating speed of the fan remains at or below the fan speed threshold. A user input is received to engage a fast charge mode and, in response thereto, the operating speed of the fan is increased above the fan speed threshold so as not to exceed the maximum fan speed.

In certain examples, the method may further include, in response to receiving the user input to engage the fast charge mode, controlling the battery charger to deliver an increased charge current that is greater than the first charge current.

In certain examples, the method may further include, in response to receiving the user input to engage the fast charge mode, controlling the battery charger to deliver a maximum charge current that maintains the temperature of the battery charger below the first temperature threshold when the operating speed of the fan is equal to the maximum fan speed.

In certain examples, the method may further include, in response to receiving the user input to engage the fast charge mode, controlling the battery charger to deliver a maximum charge current that maintains the temperature of the battery charger below a second temperature threshold when the operating speed of the fan is equal to the maximum fan speed, wherein the second temperature threshold is greater than the first temperature threshold.

In certain examples, the method may further include controlling the fan based on the temperature of the battery charger and, in response to receiving the user input to engage the fast charge mode, controlling the operating speed of the fan to be above the fan speed threshold and not exceed the maximum fan speed based on the temperature of the battery charger.

In certain examples, the method may further include, in response to receiving the user input to engage the fast charge mode, maintaining the operating speed of the fan at the maximum fan speed until a charge level of the battery reaches a threshold charge level.

One embodiment of a battery charger system includes a charger housing, a charging circuit in the charger housing configured to deliver a charge current to charge a battery, and a fan configured to circulate air within the charger housing. The battery charger system further includes a fast charge user input that is user selectable to engage a fast charge mode for the battery charger system. A controller is configured to, when the fast charge mode is not selected, control an operating speed of the fan so as not to exceed a fan speed threshold that is less than a maximum fan speed of the fan and to control the charging circuit to deliver a first charge current such that a temperature of the battery does not exceed a first temperature threshold when the operating speed of the fan is equal to the fan speed threshold. The controller is further configured to, in response to receiving selection of the fast charge user input, increase the operating speed of the fan above the fan speed threshold so as not to exceed the maximum fan speed.

In certain embodiments, the system may further include a temperature sensor configured to measure a temperature within the charger housing and the controller may be further configured to control the battery charger to deliver a maximum charge current that maintains the measured temperature below the first temperature threshold when the fast charge mode is not selected and below a second temperature threshold that is greater than the first temperature threshold when the fast charge mode is selected.

In certain examples, the controller may be further configured to, in response to receiving the user input to engage the fast charge mode, control the charging circuit to deliver an increased charge current that is greater than the first charge current. In further examples, the increased charge current is greater than a nameplate current for the battery.

In certain examples, the controller is further configured to, in response to receiving the user input to engage the fast charge mode, control the charging circuit to deliver a maximum charge current that maintains the temperature of the battery charger below either the first temperature threshold or a second temperature threshold when the operating speed of the fan is equal to the maximum fan speed.

In certain embodiments, the controller may be further configured to, in response to receiving the user input to engage the fast charge mode, maintain the operating speed of the fan at the maximum fan speed until a charge level of the battery reaches a threshold charge level.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
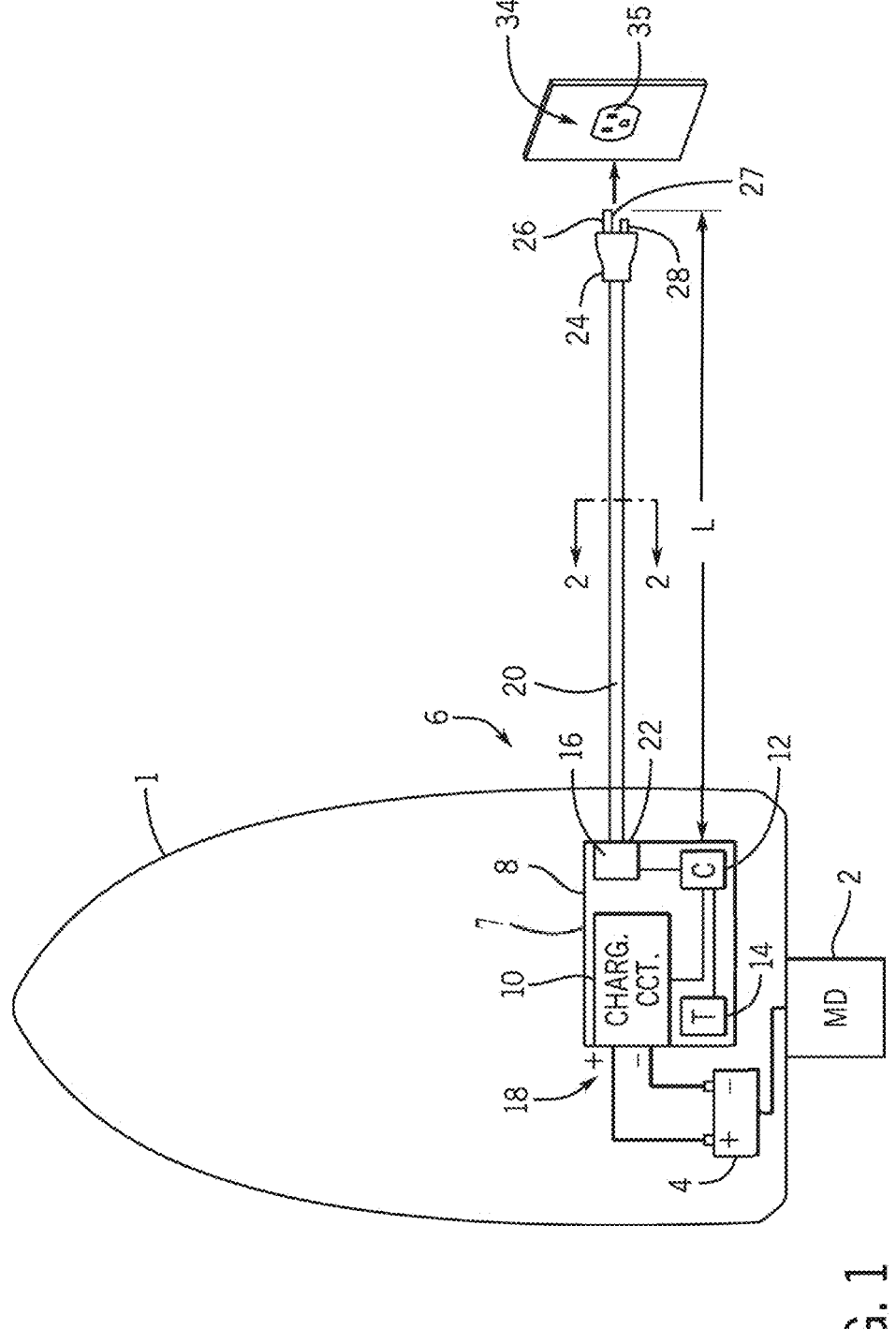
FIG. 1 depicts an exemplary battery charger system configured to be installed on a marine vessel in accordance with one embodiment of the present disclosure.

The present inventors have recognized that increasing charge current output of battery chargers requires increasing the cooling capacity of the charger, which requires increasing the rotational speed (RPM) and/or blade size of the fan. The inventors have further recognized that increasing the cooling capacity by increasing fan RPM and/or blade size significantly increases the sound generated by the charger when operating. Namely, operating the fan inside the charger at sufficiently high speed to cool the charger for providing high current output means that the charger is significantly louder than when being operated to provide a lower current output. For example, in many fan embodiments the upper 20% of fan speed toward a maximum fan speed increases the sound output by 50% or more. Thus, operating the fan at a percent of the maximum fan speed significantly reduces the amount of noise generated by the charger.

The increased noise from operating the fan at or near maximum speed is particularly disturbing where the battery charger is installed in a confined space near people. For example, in marine applications and/or recreational vehicle applications, battery chargers are installed on the marine vessel or in the recreational vehicle. The noise disturbance created by the increased fan speed negatively impacts the enjoyable use of the vessel or vehicle, interrupting people's recreation, sleep, etc.

Further, the inventors have recognized that most users of these types of battery chargers do not require fast charging, and instead often run their chargers at night or during other extended durations of low load demand. That said, through their experimentation and research the inventors have also recognized that at least some consumers highly value the ability to charge batteries as quickly as possible.

In view of the foregoing problems and challenges in the relevant art, the inventors developed the disclosed battery charger system and control method with a normal charging mode that prioritizes quiet operation and a fast charge mode that prioritizes reducing charge time. In the normal charging mode, the charger operates the fan at a lower fan RPM, well below the maximum speed of the fan, such that it generates less noise. This quieter operation is performed at the cost of less cooling capacity and thus a lower charge current output than the charger is capable of. As disclosed herein, the system and method are also operable in a fast charge mode where the fan is operated at or near the maximum fan speed such that a maximum charge current can be delivered. This reduces charge time at the cost of louder operation, and in some embodiments potentially hotter operation as well.

The disclosed charger system may include a user input device configured to be selectable by a user to engage the fast charge mode. While hotter temperature operation directly and predictably reduces the life of the charger, the system may be configured to allow the customer to choose to sacrifice a minuscule amount of charger life when they really need the charging to happen fast. In response to receiving the user input to engage the fast charge mode, the system increases the fan speed, such as to a maximum fan speed, providing the ability to increase the power output for charging the battery. In certain embodiments, the charger may be configured to increase the charge current in the fast charge mode to be greater than a nameplate current for the battery charger. As used herein, the term "nameplate current" is the current amount that the battery charger is labeled, or classified, to output (e.g., a 20 amp/12 volt battery charger has a nameplate current of 20 amps).

FIG. 1 depicts an exemplary marine battery charger system 6 configured to be installed on a marine vessel 1 to charge a marine battery 4. The marine battery charger system 6 includes marine battery charger 7 and a cord 20. The charger 7 comprises a charging circuit 10 encased in a housing 8 and configured to receive AC power from an AC power outlet 34 and to output a charge current, which is generally DC, to the marine battery 4. The housing 8 is an enclosure, such as made of plastic or metal, configured to protect and isolate the charging circuit 10 and to connect to cord 20. The housing 8 may be configured to be fastenable (e.g., by screws, hooks, Velcro, or other fastening means) to a structure within the vessel such that the marine battery charger is fixed in place on the vessel 1.

The charger system 6 includes a cord 20 having a plug end 24 configured to engage the AC power outlet 34, and specifically the socket 35 of the AC power outlet 34. The cord 20 has a length L extending from the plug end 24 to the housing 8. The cord 20 has a device end 22 that connects to the marine battery charger 7, such as to the housing 8 thereof. The plug end 24 includes prongs 26-28 that get inserted into the power socket 35 of the power outlet 34. The prongs 26-28 on the plug end 24 include, for this depicted embodiment, a first prong 26 configured to connect to the hot electrical connector in the AC power outlet, a second prong 27 configured to connect to the neutral connector in the AC power outlet, and a ground prong 28 configured to connect to a ground line in the AC power outlet.

Power conducted by the power cord 20 is received at the charging circuit 10, which is configured to modify the voltage and current to deliver a charge current output 18 at a predetermined voltage to charge the battery 4. For example, the battery charger 7 may be configured to convert the AC power input received from outlet 34 to a DC output power delivered to battery 4. An exemplary charging circuit 10 is shown and described with respect to FIG. 2.

The battery 4 may be configured to power a marine drive 2 on the marine vessel, such as an electric trolling motor or other electric motor. Alternatively or additionally, the marine battery 4 may be configured to power other devices on the marine vessel, such as steering systems, navigation systems, other house loads, etc. As will be understood by a person of ordinary skill in the art, the battery 4 may be a single battery, such as a lead-acid battery or a lithium-ion battery, or may be a bank of batteries.

The battery charger system 6 includes a controller 12 configured to control a charging operation mode of the charging circuit 10. For example, the charging operation mode may be controlled based on the charge status of the battery 4 (e.g., battery voltage or battery state of charge) and may include at least a bulk mode, an absorption mode (sometimes referred to as conditioning), and a float mode where the battery is fully charged and is being maintained. Alternative or additional modes may be generated by controller 12, such as a fault mode where a fault condition is detected and the charging circuit 10 is either disabled or operated in an altered or limited capacity.

A fan 16 is contained within the housing 8 and configured to circulate air within the charger housing 8 to cool the charging circuit 10. The fan 16 is controlled by controller 12, such as one or more microcontrollers or other programmable control devices configurable to control the fan 16, including controlling the on/off operation of the fan and controlling the rotational speed of the fan. In some embodiments, a rotational speed sensor may be included and configured to measure the actual rotational speed of the fan to provide feedback to the controller 12.

A temperature sensor 14 is positioned on or within housing 8 and configured to measure a temperature of the battery charger. The controller 12 is configured to receive the measured temperature from the temperature sensor 14 and to control the charging circuit 10 and/or the fan 16 based thereon. The temperature sensor may be located within the housing 8, such as within or near the charging circuit. Alternatively or additionally, the temperature sensor 14 may be positioned on or near the housing 8 so as to measure temperature of the housing, such as to determine or approximate a surface temperature of the housing 8 at or near a location that may be touched by a user. Alternatively or additionally, the controller 12 may be configured to receive a measured temperature at or near a heat-generating element, such as the MOSFET Q3, and to control the fan based on that measured temperature (e.g., to activate the fan once the element reaches a calibrated threshold temperature).

As will be known to a person of ordinary skill in the art in view of the present disclosure, battery chargers (such as marine battery chargers configured for installation on a marine vessel or a recreational vehicle) are required to comply with regulations dictating the maximum temperature of the housing of the charger—e.g., regulations dictating that a maximum surface temperature of the exterior surface of the charger housing not exceed 70° C. to avoid causing burns or injury to users who may touch or otherwise come in contact with the housing 8. The surface temperature may be determined by actual measurement of temperature at or near the external surface of the housing, or by temperature measurement at another location within the charger and using a thermal model to indirectly determine or estimate the external temperature of the charger.

In some embodiments, the battery charger system 6 may include multiple temperature sensors and thus the controller

12 may be configured to receive and utilize multiple temperature measurements for controlling the charging circuit and/or the fan 16. In such embodiments where multiple temperature sensors are used, the controller 12 may be programmed to utilized multiple different temperature thresholds at different locations to make sure that any one temperature threshold is not exceeded. For example, where a first temperature sensor is located in or near the charging circuit and a second temperature sensor is located on or near the external skin of the charger, the controller 12 may be configured to maintain the measured temperature of the charging circuit below a first threshold and the measured temperature of the skin below a second threshold. In such an embodiment, the first threshold temperature for the charging circuit may be a greater temperature than the second threshold for the external temperature.

Figure 2:
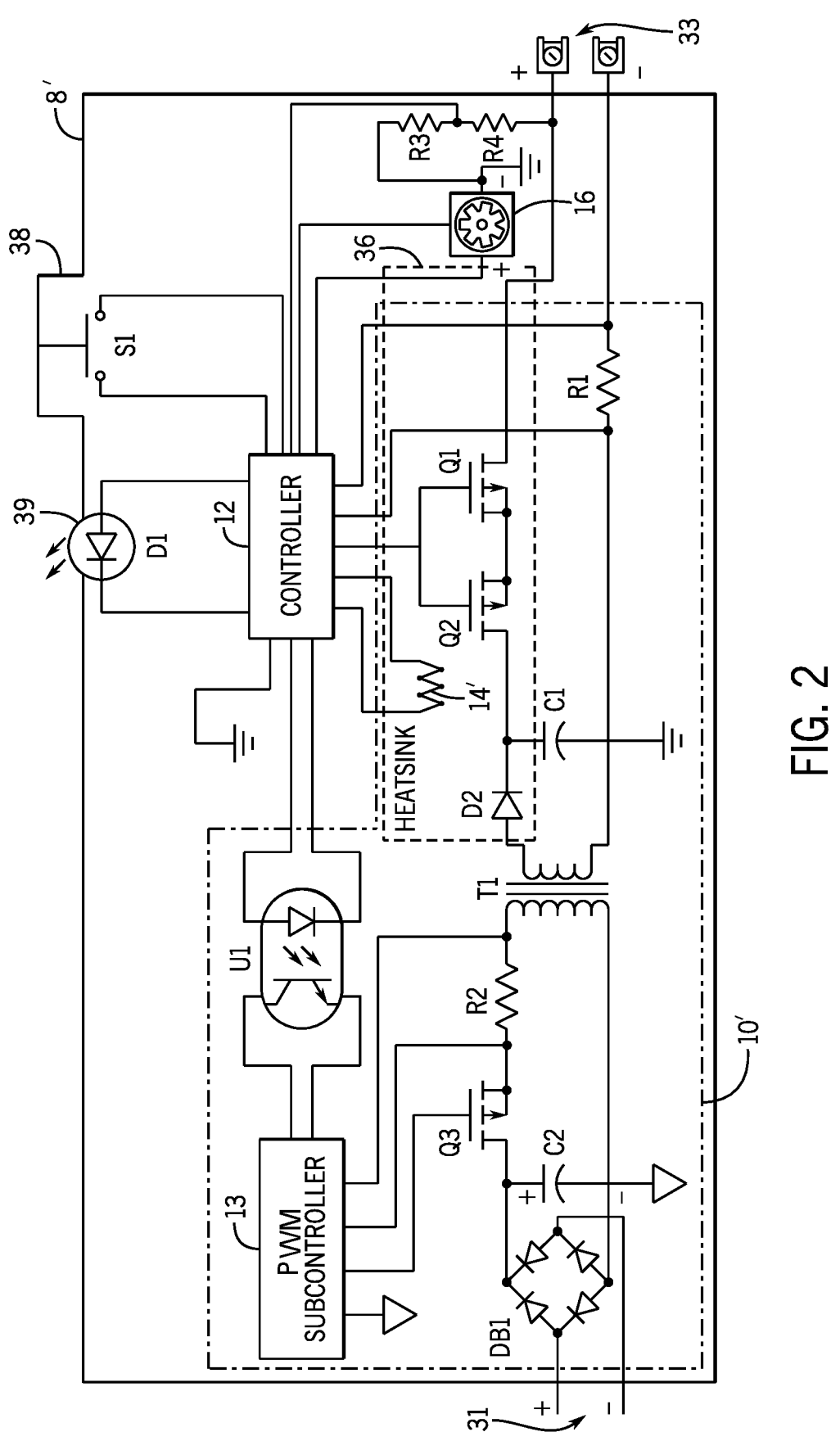
FIG. 2 is a circuit diagram showing an exemplary battery charger in accordance with another embodiment of the present disclosure.

FIG. 2 depicts one embodiment of a charging circuit 10' inside a charger housing 8'. A fast charge user input 38 is configured to be user selectable to engage a fast charge mode. In the depicted embodiment, the fast charge user input 38 is a button configured to engage and disengage the fast charge mode (e.g., a spring-loaded button or a membrane switch). Namely, pressing the button user input 38 closes the switch S1, which is connected to the controller 12. When the switch S1 is engaged, the controller 12 is configured to engage the fast charge mode. For example, the switch 38 arrangement may be a momentary switch that turns on the fast charge mode when a user depresses the button 38 and momentarily closes switch S1. Alternatively, the button 38 and switch S1 may be configured as a toggle switch. In some embodiments, the controller 12 may be configured such that the fast charge mode is disengaged by pressing the button when the fast charge mode is engaged. In other embodiments the system may be configured such that the user input is only configured to enable the fast charge mode and the controller 12 may be configured to require the user to turn off or otherwise reset the charger in order to disengage the fast charge mode.

The controller 12 illuminates the fast charge mode indicator 39, which in the depicted embodiment is a light-emitting diode (LED) D1. Thereby, a user can tell by looking at the charger housing 8 whether the fast charge mode is engaged based on whether the fast charge mode indicator 39 is illuminated (indicating that the fast charge mode is engaged) or not illuminated (indicating that the fast charge mode is not engaged). In other embodiments, the charge user input device may be a different element configured to select and deselect the fast charge mode, such as a toggle switch, a knob, or some other device controllable by a user to select the fast charge mode. For example, the fast charge user input device may be a separate element connected to the charger, such as via wireless communication by a wireless receiver inside the housing 8'. Similarly, the fast charge user input device may be an element on the marine vessel 1 or recreational vehicle, such as at the helm, through which the user can engage the fast charge mode. In such an embodiment, a control instruction may be communicated from a control module or user interface system on the marine vessel or recreational vehicle to the controller 12, such as via a CAN bus or other communication network on the marine vessel 1 or recreational vehicle.

The controller 12 is further configured to control the fan 16, including to turn the fan off and on and to set the fan speed. In the depicted example, a proportional integral derivative (PID) control loop controls a cycle of the fan 16, thereby setting the rotational speed thereof. When the fast charge mode is not engaged, the operating speed of the fan set by the controller to be less than or equal to the fan speed threshold. As described above, the fan speed threshold is less than a maximum fan speed. The maximum fan speed of the fan 16 is the maximum rotational speed that the fan is capable of or certified for. This is largely dictated by the fan motor and a maximum rotational speed of the motor and/or power arrangement of the motor.

The fan speed threshold is a rotational speed that is less than the maximum fan speed, or maximum rotational speed capabilities, of the fan 16. In one embodiment, the fan speed threshold is 80% of the maximum fan speed of the fan 16. In other embodiments, the fan speed threshold may be any value between 50% and 90% of the maximum fan speed. In certain embodiments, the fan speed threshold is set based on noise generation of the fan operation such that the overall noise generated by the fan when operating at the fan speed threshold is sufficiently quiet so as not to disturb passengers or people nearby, such as on the marine vessel where the charger is installed.

When the fast charge mode is engaged, the controller 12 increases the rotational speed of the fan above the fan speed threshold and up to the maximum fan speed. For instance, when the charger is operating in the normal charge mode the fan is operated at a first speed that is less than or equal to the fan speed threshold. Then when the fast charge user input 38 is depressed by a user to engage the fast charge mode, the controller 12 increases the rotational speed of the fan, such as to the maximum fan speed. Thus, more heat can be dissipated from the heatsink 36 when operating in the fast charge mode, which in turn allows delivery of a greater charge current for charging the battery 4 without overheating the charger.

The controller 12 is further configured to control charging circuit 10' to deliver a charge current for charging a battery 4. The charge circuit 10' receives an AC input 31, such as at the voltage and frequency provided by mains electricity, or utility power. The charging circuit 10' provides DC output power 33 at the connection point for connecting the battery 4 to be charged. The charging circuit 10' is controllable in various modes to generate a charge current available via DC output 33 for charging the battery. Controller 12 may be configured to control the charging circuit 10' based on a charge level of the battery 4, such as a measured voltage level or measured current output of the charger, and/or based on a temperature within the charger housing 8'.

In the depicted embodiment, a temperature sensor 14' is positioned in or near a heatsink region 36 of the charging circuit 10' and configured to measure a temperature thereof. Resistor R1 measures current output of the charging circuit 10'. The controller 12 receives the temperature measurement from the temperature sensor 14' and is configured to measure a voltage across the current shunt resistor R1 to determine the current delivered to the battery 4 while it is being charged and to control the output and operation of the charging circuit 10' accordingly.

The controller 12 is configured to communicate with the pulse width modulation (PWM) subcontroller 13 to control the amount of energy delivered to the transformer T1, and in turn to control the energy delivered at the DC output 33. The controller 12 is communicatively connected to the subcontroller 13 in an electrically isolated way by the photo diode U1 and is thereby isolated from the high voltage side of the charging circuit 10'. The subcontroller 13 drives the duty cycle of the MOSFET to convert the direct current (DC) to high frequency AC and to modulate the amount of energy delivered to transformer T1. The diode bridge DB1 and capacitor C2 convert the AC input 31 to DC. The subcontroller 13 determines the current controlled by the MOSFET Q3 and supplied to the transformer T1 based on the voltage across resistor R2, which can be used as control feedback for controlling the charging circuit.

The high frequency AC signal generated at the transformer T1 is then rectified to DC by the diode D2 and capacitor C1. Back-to-back MOSFETs Q1 and Q2 act as a bidirectional switch that can turn off energy delivery to the battery and also prevent draining energy from the battery when the battery is connected and the charger is not charging. A voltage divider is positioned between the output 33 and MOSFET Q1, including resistors R3 and R4, to measure battery voltage. Current shunt R1 allows the controller 12 to determine the amount of current being delivered to the battery.

Figure 3:
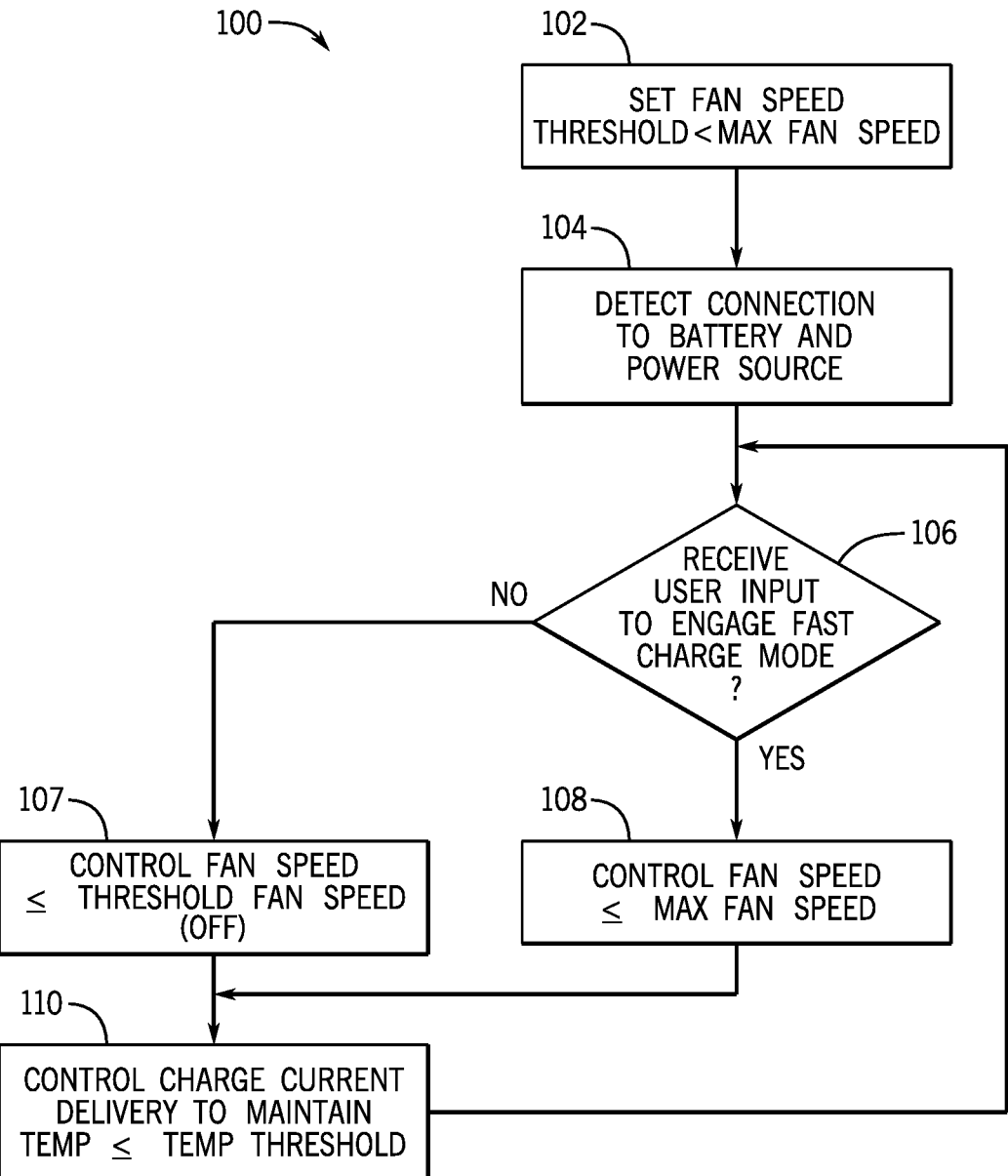
FIGS. 3-5 are exemplary methods of controlling a battery charger to charge a battery.
Figure 4:
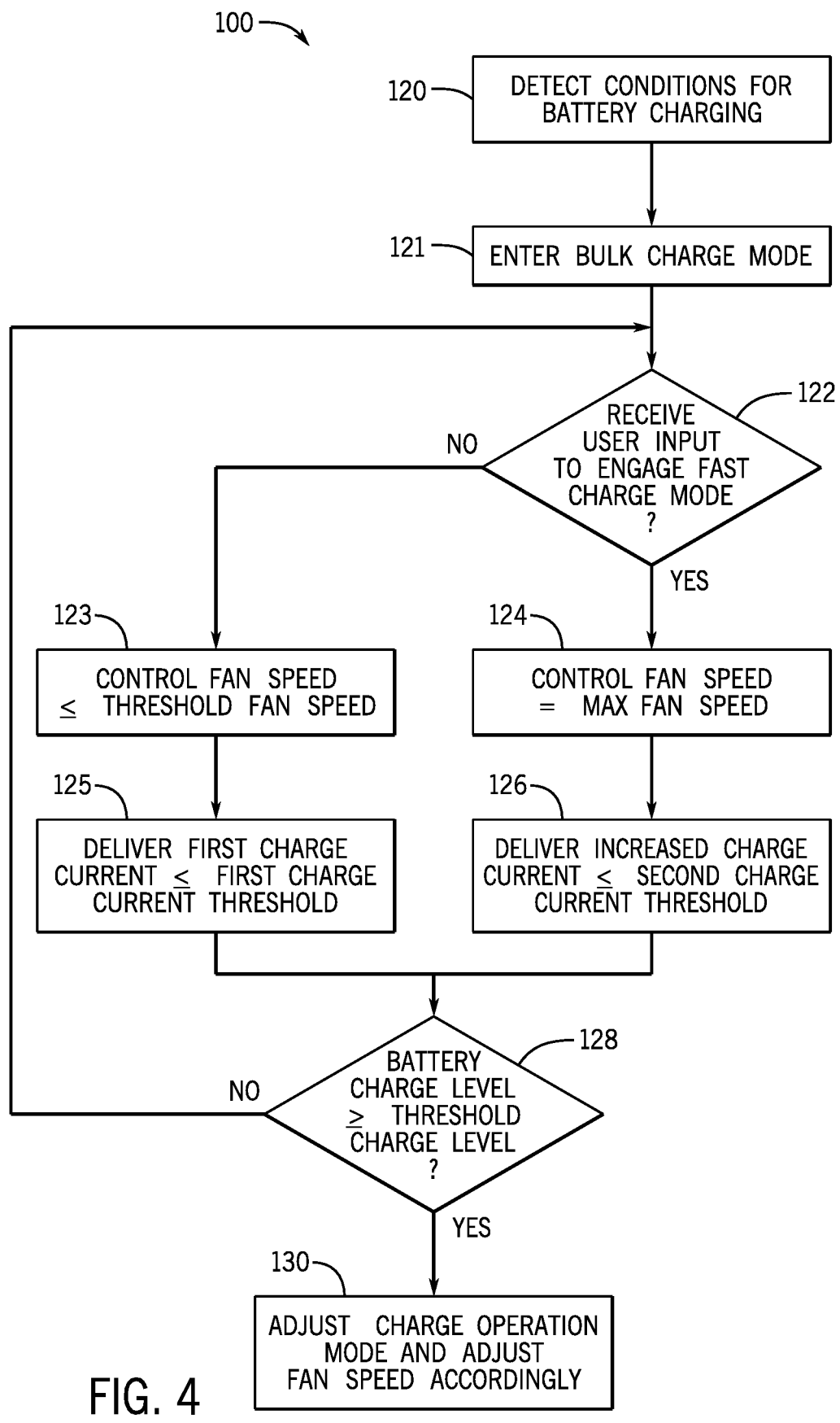
Figure 5:
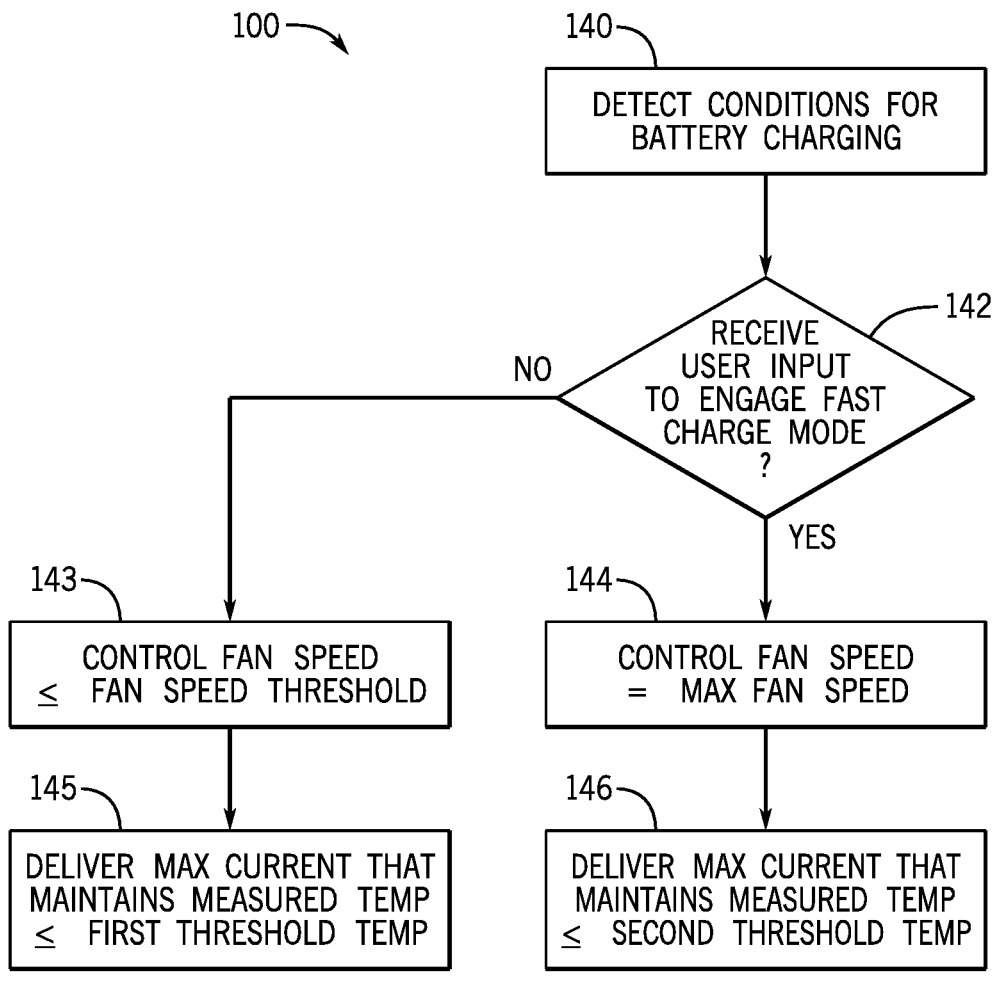

FIGS. 3-5 depict exemplary methods of controlling a battery charger to charge a battery. In FIG. 3, the method 100 includes setting a fan speed threshold at step 102 which is less than the maximum fan speed for the fan 16. Charging is commenced once conditions for charging are detected at step 104, such as connection of a battery 4 to be charged, connection to a power source such as power outlet 34, no detection of any fault condition, etc. If user input is received at step 106 to engage the fast-charging mode, then the fan 16 is operated at high speed at step 108, such as at or close to the maximum fan speed. If the fast charge mode is not engaged, then the fan 16 is operated at a rotational speed that is less than or equal to the threshold fan speed at step 107. Initially, when charging commences the fan may remain off and may only be turned on once the measured temperature reaches a threshold to turn on the fan, for example.

The controller 12 then controls delivery of charge current 110 by the charge circuit to maintain a temperature of the battery charger at or below the first temperature threshold. For example, the controller 12 may be configured to control the charging circuit 10' to deliver a charge current, such as a maximum charge current that maintains a temperature of the charger below a temperature threshold. For example, the temperature of the battery charger may be measured by temperature sensor 14, 14' and the charging circuit 10, 10' may be controlled to maximize a delivered current while maintaining the measured temperature at or below a predetermined temperature threshold. Thus, in certain embodiments, the charge current delivered when the fast charge mode is engaged is higher than that delivered during the normal charge mode because the increased fan speed dissipates heat more quickly and thus enables a higher current delivery while maintaining the temperature at or below the threshold. The system may be configured such that the user can engage (and in some embodiments disengage) the fast charge mode at any point in the charging process, and the controller 12 is configured to control fan speed and charge current delivery accordingly.

FIG. 4 depicts another embodiment of a method 100 of controlling a battery charger to charge a battery. Conditions for battery charging are detected at step 120. Bulk charge mode is entered at step 121 to deliver bulk charge to the battery. If user input is not received to engage the fast charge mode, then the charger is operated in the normal bulk mode and the operating speed of the fan is controlled such that it does not exceed the threshold fan speed at step 123 and a first charge current is delivered at step 125. As described above, the fan may remain off at the start of bulk mode charging and may only be turned on once the charger gets sufficiently hot. The first charge current is controlled such that it does not exceed a first charge current threshold.

The first charge current threshold may be a calibrated value based on the fan speed threshold, such as the amount of current that can be delivered by the charger while maintaining the measured temperature below the first temperature threshold when the surrounding environmental temperature of the charger is room temperature (e.g., 25° C.). The first charge current threshold may alternatively be a more conservative value calibrated for a higher environmental temperature such that the charger maintains a lower operating temperature in a wide array of environmental conditions while operating in the normal mode. Since often users are not in a hurry to charge batteries and may prefer less noise disturbance from the battery charger, the first charge current threshold may be established to optimize lower fan speed noise and operating temperature of the charger.

If the user engages the fast charge mode at step 122 via the fast charge user input device 38, then the fan speed is increased and the charge current delivery may also be increased. In the example at FIG. 4, the fan speed is increased up to the maximum fan speed step 124. An increased charge current is delivered at step 126. For example, the increased charge current may be controlled such that it does not exceed a second charge current threshold, wherein the second charge current threshold is greater than the first charge current threshold. The second charge current threshold may be a predetermined value calibrated based on the maximum fan speed, such as to maintain the battery charger temperature below a temperature threshold (which may be the first temperature threshold or a second temperature threshold that is greater than the first temperature threshold) when the environmental temperature of the charger is room temperature or some other predetermined environmental temperature. The second charge current threshold may be calibrated to maximize delivery of charge current to reduce battery charge time. Thus, in fast charge mode the charger may be configured to run hotter and louder to achieve a faster charge time.

The higher operating speed of the fan and the increased charge current delivery may be maintained until a charge level of the battery reaches a threshold charge level, such as a threshold charge level indicating that the battery is fully charged or at some predetermined charge threshold approaching full charge triggering the charger to exit bulk mode. Referring to FIG. 4, once the battery charge level becomes greater than or equal to the threshold charge level at step 128, the charger operation mode may be adjusted, such as to shift from bulk mode to conditioning mode, and the fan speed is adjusted accordingly at step 130. In some embodiments, the controller 12 may be configured to automatically deactivate the fast charge mode once bulk mode charging is complete and may concurrently reduce the fan speed to value at or below the threshold fan speed. For example, the fan speed may be reduced, such as controlled based on temperature to remain at or below the threshold fan speed.

FIG. 5 depicts another example of a method 100 of controlling a battery charger. Conditions for charging are detected at step 140, such as the conditions described above with respect to the examples at FIGS. 3 and 4. If the fast charge mode is not engaged, then the fan is operated at or below the fan speed threshold at step 143 and a first charge current is delivered accordingly at step 145, which in this example is a maximum charge current that maintains the measured temperature of the battery charger at or below a first threshold temperature. In certain embodiments, a high current maximum may also be established based on the current ratings of certain electronic devices or other elements in the charging circuit, and the current may be controlled such that it does not exceed that high current maximum (such as when operating the charger in a very low environmental temperature that allows very efficient cooling).

In response to receiving user input to engage the fast charge mode at step 142, the operating speed of the fan is then increased to the maximum fan speed at step 144. Current delivery is increased accordingly at step 146. In the example at FIG. 5, the charge circuit is controlled to deliver a maximum charge current that maintains the measured temperature of the charger at or below a second threshold temperature, wherein the second threshold temperature is greater than the first threshold temperature. For example, the second threshold temperature may be 5° C. or 10° C. greater than the first threshold temperature, or in some embodiments up to 15° C.-20° C. greater.

The threshold temperatures may also vary depending on where temperature is being measured or calibrated to. For instance, if the temperature thresholds are external temperatures of the charger housing, the first threshold temperature may be 50° C. and the second threshold temperature may be 60° C. In another similar example, the first threshold temperature may be 55° C. and the second threshold temperature may be 65° C. Where the temperature thresholds are based on an internal temperature of the charger, such as temperature sensor 14' located in the heat sink 36 of the charging circuit 10', the threshold values may be higher. In such an embodiment, for example, the first threshold temperature may be 60° C. and the second threshold temperature may be 70° C.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of controlling a battery charger to charge a battery, the method comprising:

setting a fan speed threshold for a fan within the battery charger, wherein the fan speed threshold is less than a maximum speed of the fan;

controlling an operating speed of the fan in the battery charger so as not to exceed the fan speed threshold;

controlling the battery charger to deliver a first charge current in a first charge mode such that a temperature of the battery charger does not exceed a first temperature threshold while the operating speed of the fan does not exceed the fan speed threshold;

receiving a user input to engage a fast charge mode that is different than the first charge mode; and in response to receiving the user input to engage the fast charge mode, increasing the operating speed of the fan above the fan speed threshold and operating the fan between the fan speed threshold and the maximum fan speed while the fast charge mode is engaged.

2. The method of claim 1, further comprising measuring the temperature of the battery charger with a temperature sensor, and wherein controlling the battery charger in the first charge mode to deliver the first charge current includes delivering a maximum charge current that maintains the measured temperature below the first temperature threshold while the operating speed of the fan does not exceed the fan speed threshold.

3. The method of claim 1, further comprising, in response to receiving the user input to engage the fast charge mode, controlling the battery charger to deliver an increased charge current that is greater than the first charge current.

4. The method of claim 3, wherein the increased charge current is greater than a nameplate current for the battery charger.

5. The method of claim 3, wherein the first charge current does not exceed a first charge current threshold calibrated based on the fan speed threshold, wherein the increased charge current does not exceed a second charge current threshold that is greater than the first charge current threshold.

6. The method of claim 5, wherein the increased charge current is greater than the first charge current threshold.

7. The method of claim 5, wherein the second charge current threshold is a predetermined value calibrated based on the maximum fan speed.

8. The method of claim 3, further comprising, in response to receiving the user input to engage the fast charge mode, measuring the temperature of the battery charger with a temperature sensor and controlling delivery of the increased charge current based on the measured temperature to maintain the measured temperature below the first temperature threshold when the operating speed of the fan is equal to the maximum fan speed.

9. The method of claim 3, further comprising, in response to receiving the user input to engage the fast charge mode, measuring the temperature with a temperature sensor in the battery charger and controlling delivery of the increased charge current based on the measured temperature to maintain the measured temperature below a second temperature threshold when the operating speed of the fan is equal to the maximum fan speed, wherein the second temperature threshold is greater than the first temperature threshold.

10. The method of claim 1, further comprising, in response to receiving the user input to engage the fast charge mode, controlling the battery charger to deliver a maximum charge current that maintains the temperature of the battery charger below the first temperature threshold when the operating speed of the fan is equal to the maximum fan speed.

11. The method of claim 1, further comprising, in response to receiving the user input to engage the fast charge mode, controlling the battery charger to deliver a maximum charge current that maintains the temperature of the battery charger below a second temperature threshold when the operating speed of the fan is equal to the maximum fan speed, wherein the second temperature threshold is greater than the first temperature threshold.

12. The method of claim 1, further comprising, in response to receiving the user input to engage the fast charge mode, maintaining the operating speed of the fan at the maximum fan speed until a charge level of the battery reaches a threshold charge level.

13. The method of claim 1, further comprising, in response to receiving the user input to engage the fast charge mode, controlling the operating speed of the fan to be above the fan speed threshold and not to exceed the maximum fan speed based on the temperature of the battery charger.

14. A battery charger system comprising:
   a charger housing;
   a charging circuit in the housing configured to deliver a charge current to charge a battery;

a fan configured to circulate air within the charger housing;
   a fast charge user input configured to be user selectable to engage a fast charge mode;
   a controller configured to:
      when the fast charge mode is not selected, control an operating speed of the fan in a first charge mode so as not to exceed a fan speed threshold, wherein the fan speed threshold is less than a maximum fan speed of the fan, and control the charging circuit to deliver a first charge current such that a temperature of the battery charger does not exceed a first temperature threshold when the operating speed of the fan is less than or equal to the fan speed threshold; and
      in response to receiving selection of the fast charge user input, increase the operating speed of the fan above the fan speed threshold and operating the fan between the fan speed threshold and the maximum fan speed while the fast charge mode is engaged.

15. The system of claim 14, further comprising a temperature sensor configured to measure a temperature on or within the charger housing, and wherein the controller is further configured to control the battery charger to deliver a maximum charge current that maintains the measured temperature below the first temperature threshold.

16. The system of claim 14, wherein the controller is further configured to, in response to receiving the user input to engage the fast charge mode, control the charging circuit to deliver an increased charge current that is greater than the first charge current.

17. The system of claim 16, wherein the first charge current does not exceed a first charge current threshold calibrated based on the fan speed threshold, wherein the increased charge current does not exceed a second charge current threshold that is greater than the first charge current threshold.

18. The system of claim 16, wherein the increased charge current is greater than a nameplate current for the battery charger.

19. The system of claim 16, further comprising a temperature sensor configured to measure a temperature on or within the charger housing, and wherein the increased charge current is controlled based on the measured temperature to maintain the battery charger below the first temperature threshold when the operating speed of the fan is equal to the maximum fan speed.

20. The system of claim 16, wherein the controller is further configured to, in response to receiving the user input to engage the fast charge mode, control the charging circuit to deliver a maximum charge current that maintains the temperature of the battery charger below either the first temperature threshold or a second temperature threshold that is greater than the first temperature threshold when the operating speed of the fan is equal to the maximum fan speed.

21. The system of claim 16, wherein the controller is further configured to, in response to receiving the fast charge user input, maintaining the operating speed of the fan at the maximum fan speed until a charge level of the battery reaches a threshold charge level.

22. The system of claim 16, wherein the controller is further configured to, in response to receiving the fast charge user input, controlling the operating speed of the fan to be above the fan speed threshold and not to exceed the maximum fan speed based on the temperature of the battery charger.

\* \* \* \* \*